(12) United States Patent
Matsumoto et al.

(10) Patent No.: US 6,394,466 B1
(45) Date of Patent: May 28, 2002

(54) END MILL CHUCKING STRUCTURE

(75) Inventors: Masakazu Matsumoto; Masahiro Taguchi; Yusaku Yamamoto, all of Osaka (JP)

(73) Assignee: Nikken Kosakusho Works Ltd., Osaka-Fu (JP)

( * ) Notice: Subject to any disclaimer, the term of this patent is extended or adjusted under 35 U.S.C. 154(b) by 0 days.

(21) Appl. No.: 09/487,416

(22) Filed: Jan. 20, 2000

(30) Foreign Application Priority Data

Feb. 16, 1999 (JP) .......................................... 11-037438
Sep. 7, 1999 (JP) .......................................... 11-253305
Oct. 15, 1999 (JP) .......................................... 11-294111

(51) Int. Cl.$^7$ ......................... B23P 11/02; B23B 31/117
(52) U.S. Cl. ......................... 279/103; 29/447; 403/273; 409/234; 408/57; 279/83
(58) Field of Search ................................ 279/102, 103, 279/83, 97; 29/447; 403/273; 409/234; 408/57, 59

(56) References Cited

U.S. PATENT DOCUMENTS

| | | | | |
|---|---|---|---|---|
| 3,494,642 A | * | 2/1970 | Coberly | 403/273 |
| 3,678,632 A | * | 7/1972 | Eversole et al. | 409/234 |
| 4,795,292 A | * | 1/1989 | Dye | 409/234 |
| 5,280,671 A | * | 1/1994 | Marquart | 29/447 |
| 5,311,654 A | * | 5/1994 | Cook | 29/447 |
| 5,391,022 A | * | 2/1995 | Nakayama et al. | 279/83 |
| 5,468,102 A | * | 11/1995 | Stojanovski | 409/234 |
| 5,716,173 A | * | 2/1998 | Matsumoto | 409/234 |
| 6,315,506 B1 | * | 11/2001 | Mizoguchi | 409/234 |

FOREIGN PATENT DOCUMENTS

JP  10-354175  12/1998

* cited by examiner

*Primary Examiner*—Steven C. Bishop
(74) *Attorney, Agent, or Firm*—Ladas & Parry

(57) ABSTRACT

An end mill chucking structure for chucking an end mill having a relatively small diameter and used, for example, for deep milling of a die. The end mill chucking structure includes an end mill holder and an end mill. A holder body has a taper hole formed therein. The end mill includes an end mill body and a cutting tip provided at an end portion of the end mill body. A portion of the end mill body located opposite the cutting tip serves as a tapered shank portion. The shank portion and the rest of the end mill body are bounded by a shoulder extending outward from the surface of the shank portion. The shank portion is press-fitted or shrink-fitted into the taper hole such that the end face of the holder body abuts the shoulder of the end mill body, through application to the holder body of heat at a temperature lower than a conventional shrink-fitting temperature.

18 Claims, 8 Drawing Sheets

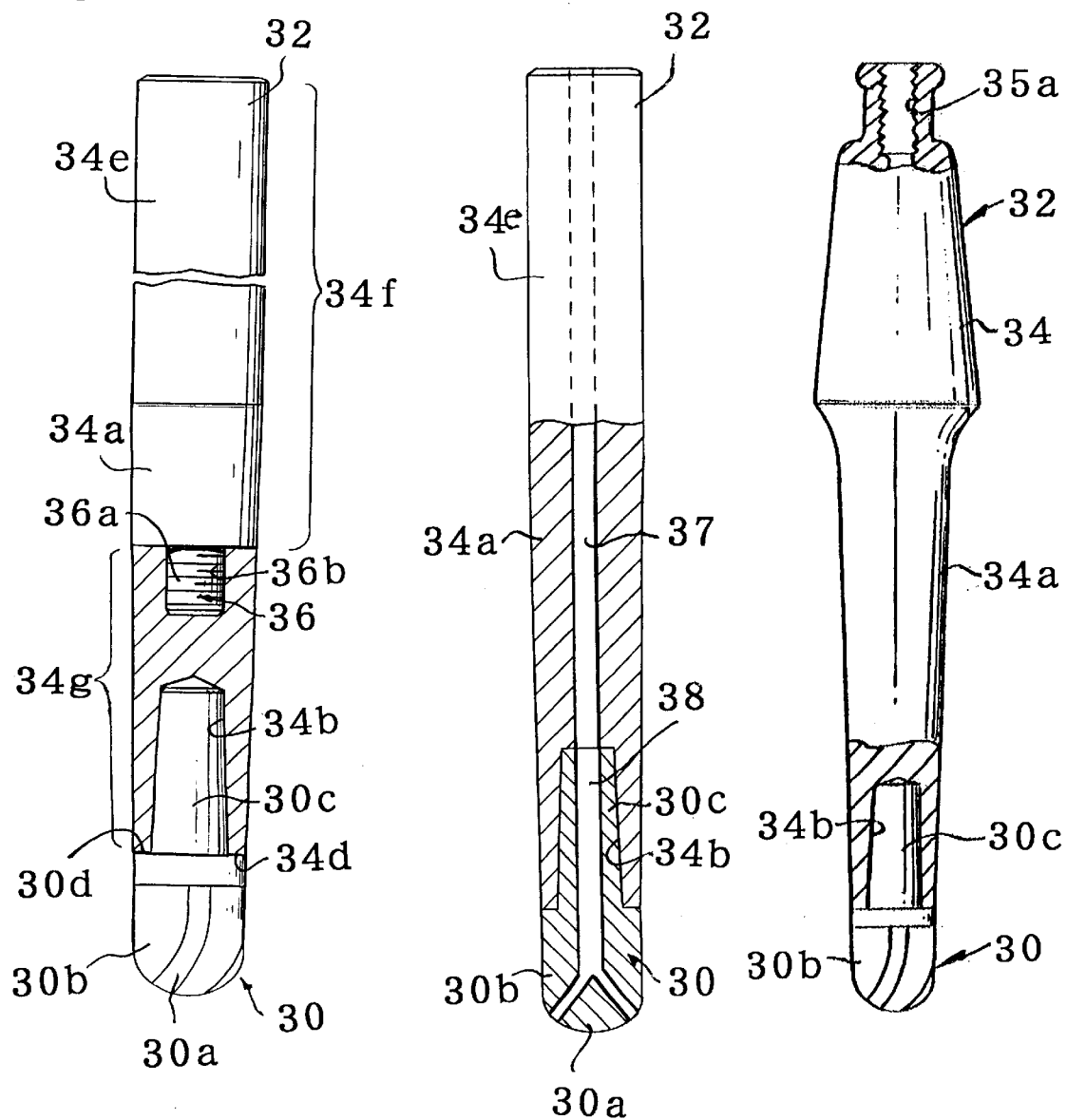

END MILL CHUCKING STRUCTURE

BACKGROUND OF THE INVENTION

1. Field of the Invention

The present invention relates to a chucking structure for chucking an end mill having a relatively small diameter and used, for example, for deep milling of a die.

2. Description of the Related Art

FIG. 1 shows a conventional end mill chucking structure. As shown in FIG. 1, a straight hole 1c is formed in a front cylindrical portion 1b of a holder body 1a of a tool holder 1. An end mill 2 includes an end mill body 2a, which, in turn, includes a round-rod-shaped shank portion 2b. A rear portion of the shank portion 2b of the end mill 2 is fitted into the straight hole 1c formed in the tool holder 1. A plurality of side lock members 3a and 3b are screwed into the front cylindrical portion 1b of the tool holder 1 from the outer circumferential surface thereof so as to press the fitted rear portion of the shank portion 2b against the wall surface of the straight hole 1c, thereby fixedly attaching the end mill 2 to the tool holder 1.

In the case of the conventional end mill 2 shown in FIG. 1, a relatively long front portion of the shank portion 2b projects frontward from the tool holder. Thus, the shank portion 2b fails to maintain sufficient rigidity, resulting in an impairment in cutting performance and involving vibration, such as pitching, during cutting.

FIG. 2 shows another conventional end mill chucking structure. An end mill 2 includes an end mill body 2a of carbide, which, in turn, includes a shank portion 2b shorter than that shown in FIG. 1. An end portion of the shank portion 2b is shrink-fitted into a straight hole 1c formed in a tool holder 1. The outer circumferential surface of the end portion of the shank portion 2b is gripped by means of the wall surface of the straight hole 1c formed in the tool holder 1; i.e., single-surface restraint is established so as to fixedly attach the end mill 2 to the tool holder 1.

In the case of the conventional shrink-fitted chucking as shown in FIG. 2, the tool holder 1 is heated, and then the shank portion 2b of the end mill 2 is fitted to the tool holder 1. When the shank portion 2b is to be removed from the tool holder 1, the entire tool holder 1, to which the end mill 2 is attached, is heated so as to be thermally expanded. Then, the shank portion 2b is removed from the tool holder 1. Accordingly, the material of the tool holder 1 has a greater coefficient of thermal expansion than does the material of the end mill 2; i,e., the tool holder 1 and the end mill 2 must be formed of metals of different coefficients of thermal expansion.

In this connection, the applicant of the present invention filed Japanese Patent Application No. 10-354175 on Dec. 14, 1998 in relation to a shank-integrated end mill. As is disclosed in the patent application, a front portion of a holder body of an end mill holder is formed into a taper portion which tapers down frontward. A small-diameter hole is formed coaxially in the taper portion in such a manner as to extend rearward from a front end. A rear portion of a shank portion of an end mill body is formed into a small-diameter portion. The small-diameter portion of the end mill body is shrink-fitted into the small-diameter hole formed in the holder body, such that a shoulder located at the front end of the small-diameter portion abuts the front end face of the taper portion of the holder body. Cutting means is provided at a front end portion of the end mill body. In the shank-integrated end mill, the shank portion of the end mill body is rendered short to thereby decrease the cost of the end mill. Further, the outer circumferential surface of the small-diameter portion of the shank portion of the end mill body is gripped by means of the wall surface of the small-diameter hole formed in the end mill holder, and the entire face of the shoulder of the shank portion abuts the front end face of the end mill holder; i.e., two-surface restraint is established so as to fixedly attach the end mill body to the holder body. Thus, the rigidity of the end mill becomes considerably high, so that vibration hardly occurs during cutting, resulting in good cutting performance.

FIG. 3 shows still another conventional end mill chucking structure using a collet. The collet includes a taper shank portion 4A, which is fitted into a taper hole 1A formed in a tool holder 1, and a taper arbor portion 4B, which extends over a predetermined length from the larger-diameter end of the taper shank portion 4A coaxially with and in opposition to the taper shank portion 4A while tapering down. A straight hole 4C having a predetermined length and diameter is formed coaxially in the arbor portion 4B in such a manner as to extend from the front end thereof toward the taper shank portion 4A. The arbor portion 4B is heated to a temperature of about 300° C. to thereby be thermally expanded. A straight shank portion 2b of an end mill 2 is fitted into the thermally expanded straight hole 4C. The end mill 2 is thus chucked in the collet 4 through shrink fit.

The taper shank portion 4A of the collet 4 to which the end mill 2 is shrink-fitted is inserted into the taper hole 1A formed in the tool holder 1. Subsequently, a draw bolt 5 is screwed into a female-threaded hole 4D formed in an end portion of the taper shank portion 4A so as to fixedly attach the collet 4 to the tool holder 1, thereby fixedly attaching the end mill 2 to the tool holder 1.

In the case of the conventional shrink-fitted chucking as shown in FIG. 3, the shank portion 2b of the end mill 2 and the hole 4C, into which the shank portion 2b is shrink-fitted, are both straight. Accordingly, when the shank portion 2b of the end mill 2 is to be shrink-fitted into the straight hole 4C formed in the collet 4 or when the end mill 2 is to be removed from the collet 4 through application of heat, the arbor portion 4B of the collet 4 must be heated to a temperature of 300° C. or higher for smooth shrink-fitting or removal. When shrink-fitting or removal is repeated frequently for replacement of the end mills 2, the material of the arbor portion 4B undergoes a change in physical properties due to frequent application of heat, even when the collet 4 is made of special steel having excellent coefficient of thermal expansion and strength. As a result, the collet 4 fails to chuck the end mill 2 reliably.

Since the end mill 2 shrink-fitted to the collet 4 is restrained merely by means of the shank portion 2b in contact with the wall surface of the strait hole 4C formed in the collet 4, the rigidity of an end portion of the end mill 2 if projecting from the collet 4 becomes relatively low, resulting in a strong likelihood of subtle vibration during cutting.

SUMMARY OF THE INVENTION

An object of the present invention is to solve the above problems involved in the conventional end mill chucking structure, and to provide attend mill chucking structure enabling press-fitting, shrink-fitting, or removal of an end mill through application of heat at relatively low temperature in order to prevent a change in physical properties of material and capable of improving the rigidity of the end mill.

To achieve the above object, the present invention provides an end mill chucking structure comprising an end mill holder, which comprises a holder body, and an end mill, which in turn comprises an end mill body and cutting means provided at a front end portion of the end mill body. The holder body has a taper hole formed in a front portion thereof. The taper hole tapers down rearward and extends rearward from a front end of the holder body. Herein, the term "front" refers to a cutting-end side of the end mill attached to the end mill holder with respect to the axial direction of the end mill holder, and the term "rear" refers to the side opposite the front side. A rear portion of the end mill body is formed into a shank portion tapering down rearward. The rear end face of the front portion of the end mill body extends outward from the outer circumferential surface of the shank portion. The shank portion of the end mill body is press-fitted or shrink-fitted into the taper hole formed in the holder body through application of heat at a temperature lower than a conventional shrink-fitting temperature such that the rear end face of the front portion of the end mill body abuts the front end face of the holder body, to thereby fixedly attach the end mill body to the holder body. According to the present invention, heat for press-fitting or shrink-fitting may be applied to the holder body at a relatively low temperature, and the end mill body can be easily attached to or detached from the holder body. Since the shank portion of the end mill can be shortened, the end mill can be rendered inexpensive. The outer circumferential surface of the shank portion of the end mill body is gripped by means of the wall surface of the taper hole formed in the holder body, and the rear end face of the front portion of the end mill body abuts the front end face of the holder body; i.e., two-surface restraint is established, thereby maintaining considerably high rigidity of the end mill and preventing vibration of the end mill during cutting to thereby yield good cutting performance.

Preferably, the rear end face of the front portion of the end mill body extends perpendicularly from the outer circumferential surface of the shank portion. Thus, vibration of the end mill during cutting can be prevented more effectively.

Preferably, the front portion of the end mill body is formed into a relatively long taper portion which tapers down frontward. The rear end of the taper portion has a diameter smaller than that of the front end face of the holder body. Thus, stable chucking is established between the end mill and the end mill holder. In the case of wear of a cutting edge, a throwaway tip may be replaced without removal of the end mill from the holder body. Material for the end mill is not required to have a coefficient of thermal expansion different from that of material for the end mill holder. The end mill may be made of cemented carbide or, for example, HSS, which has a coefficient of thermal expansion substantially identical to that of material for the end mill holder.

Preferably, the rear end face of the front portion of the end mill body is caused to abut the front end face of the holder body by means of a draw bolt accommodated within the front portion of the holder body, to thereby fixedly attach the end mill body to the holder body. Through employment of the draw bolt, the rigidity of the end mill is improved, so that cutting can be performed more reliably. Alternatively, female threads are formed on a wall surface of the taper hole formed in the holder body to thereby form a female-threaded portion; male threads are formed on the outer circumferential surface of a rear portion of the shank portion of the end mill body to thereby form a male-threaded portion; and the male-threaded portion is screwed into the female-threaded portion to thereby fixedly attach the end mill body to the holder body. As compared to the case of employment of the draw bolt, the rigidity of the end mill is impaired slightly; however, the holder body and the end mill can be manufactured more easily.

Preferably, a groove is formed on the wall surface of the taper hole formed in the holder body, or a small hole is formed in the holder body, so as to discharge fluid, such as coolant, therethrough and frontward from the holder body. Preferably, a discharge angle modification member for directing fluid to be discharged from the holder body is disposed at a front end portion of the small hole which extends axially in the holder body so as to discharge the fluid therethrough. Through discharge of fluid from the holder body, a workpiece can be cooled, or adhesion of chips to the workpiece or end mill can be prevented, as needed, during cutting.

The present invention further provides an end mill chucking structure comprising an adapter having a shank portion and an arbor portion. A taper hole of a predetermined depth is formed coaxially in the arbor portion and extends from the front end of the arbor portion toward the shank portion. An end mill has a mill body portion and a taper shank portion extending coaxially from the rear end of the mill body portion. The taper shank portion is press-fitted or shrink-fitted into or removed through application of heat from the taper hole formed in the arbor portion of the adapter. Thus, the end mill can be shrink-fitted into or removed from the adapter with ease, through application of heat at such a low temperature as not to cause a change in physical properties of adapter material. Also, an end mill having a small diameter can be chucked easily.

According to the present invention, the rear end face of the mill body portion projects outward from the taper shank portion in a flange-like manner so as to serve as a contact face, and abuts the front end face of the arbor portion of the adapter upon fitting of the taper shank portion into the taper hole. Thus, the end mill is restrained by means of two surfaces; specifically, the outer circumferential surface of the taper shank portion and the contact face, thereby improving the rigidity of the end mill and preventing vibration of the end mill during cutting to thereby yield good cutting performance.

Preferably, a front end portion of the adapter—into which the end mill is press-fitted or shrink-fitted and from which the end mill is removed through application of heat—is made of steel having a relatively high coefficient of thermal expansion, thereby further lowering the temperature at which heat is applied to the front end portion of the adapter for press-fitting or shrink-fitting the end mill thereinto or for removing therefrom.

Preferably, a passage is formed in the adapter and end mill so as to supply fluid, such as coolant, therethrough to a cutting point. Through supply of coolant, a workpiece can be cooled, or adhesion of chips to the workpiece can be prevented, during cutting, thereby yielding good cutting performance free of cutting scorch or scratches.

Preferably, the shank portion of the adapter is tapered, thereby not requiring use of a taper collet and decreasing run-out of the end mill.

Preferably, a locking mechanism is employed in order to prevent rotation of the end mill fitted to the adapter. When a small-diameter end mill is used, a gripping force of a front end portion of the adapter decreases. Specifically, as the front-end diameter of the adapter decreases, the wall thickness of the front end portion of the adapter decreases. As a result, during cutting, the shank portion of the end mill slips within the hole formed in the front end portion of the adapter due to expansion of the hole. The locking mechanism prevents such slippage of the end mill, thereby providing a highly accurate end mill chucking structure which does not involve an increase in run-out of the end mill.

BRIEF DESCRIPTION OF THE DRAWINGS

FIG. 14 is a partially cutaway side view showing a modified embodiment of the end mill chucking structure of FIG. 12;

FIG. 15 is a partially cutaway side view showing another modified embodiment of the end mill chucking structure of FIG. 12;

FIG. 16 is a partially cutaway side view showing still another modified embodiment of the end mill chucking structure of FIG. 12;

DESCRIPTION OF THE PREFERRED EMBODIMENTS

Embodiments of the present invention will next be described in detail with reference to the drawings.

Figure 1:
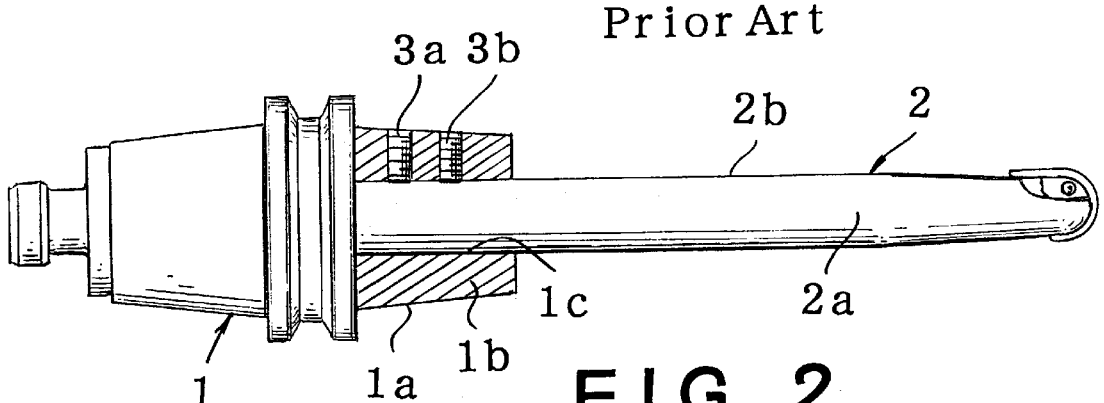
FIG. 1 is a partially cutaway side view showing a conventional end mill chucking structure.
Figure 2:
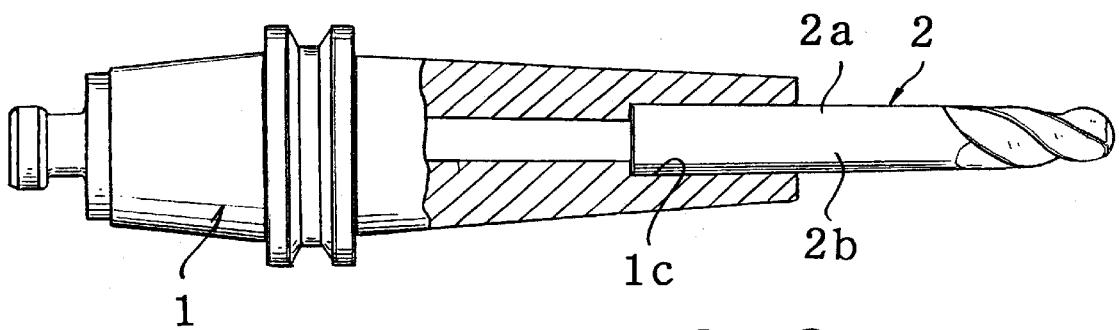
FIG. 2 is a partially cutaway side view showing another conventional end mill chucking structure.
Figure 3:
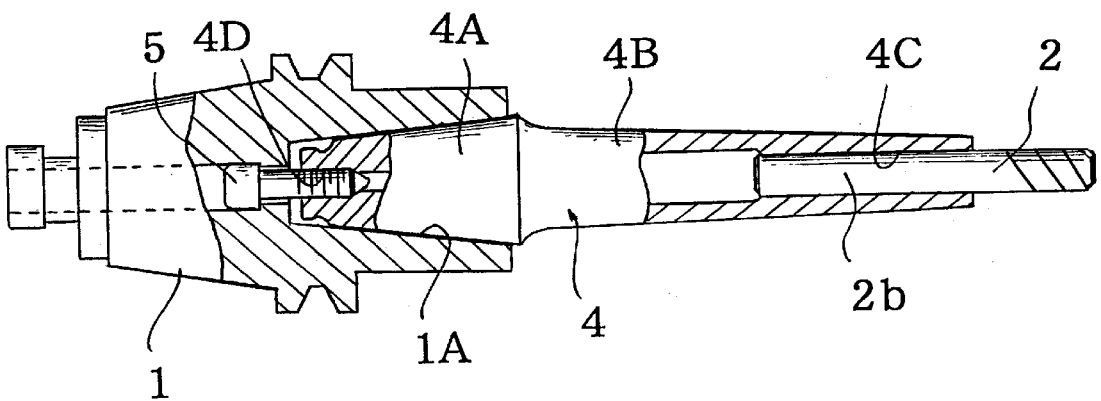
FIG. 3 is a partially cutaway side view showing still another conventional end mill chucking structure.
Figure 4:
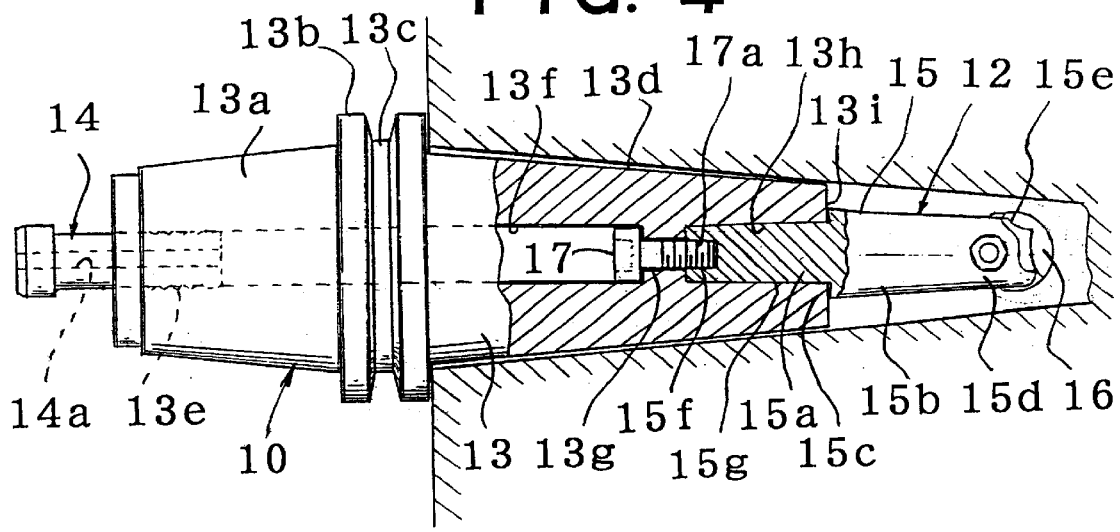
FIG. 4 is a partially cutaway side view of an end mill chucking structure according to a first embodiment of the present invention.
Figure 5:
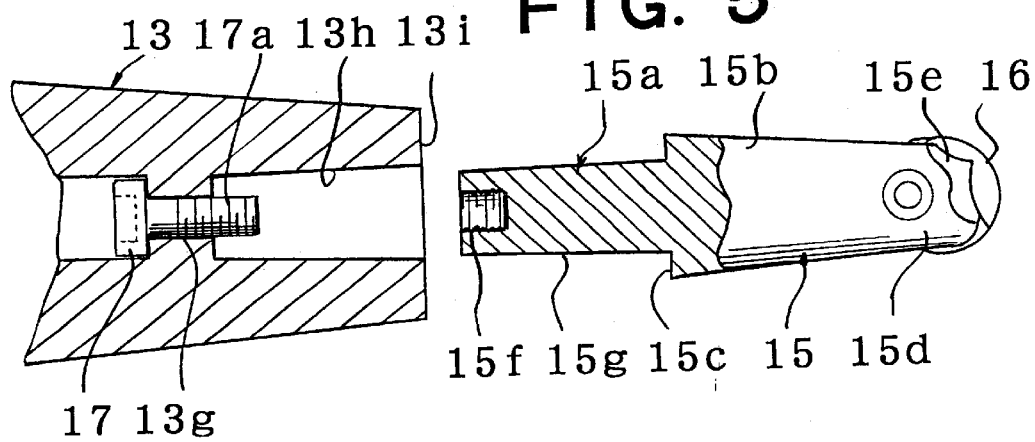
FIG. 5 is an exploded, partially cutaway side view showing a main portion of the end mill chucking structure of FIG. 4 and representing disengagement of an end mill body from a holder body.

As shown in FIGS. 4 and 5, an end mill chucking structure according to a first embodiment of the present it invention includes an end mill holder 10 and an end mill 12, which are made of an elastic metal, such as steel.

The end mill holder 10 has a taper shank portion 13a formed at a rear end portion of a holder body 13; a flange portion 13b formed at an intermediate portion of the holder body 13 for use in automatic tool change; a V-groove 13c formed on an outer circumferential surface of the flange portion 13b; and a long taper portion extending frontward from the flange portion 13b and tapering down frontward.

The holder body 13 has the following holes formed coaxially and sequentially from the rear end to the front end thereof: a female-threaded hole 13e; an intermediate hole 13f; a small-diameter hole 13g; and a taper hole 13h which tapers down rearward gently, for example, at a taper of 1/200 and which opens at the front end of the holder body 13. The taper portion 13d tapers down frontward at an angle of about 5° to 6°. A front end 13i of the taper portion 13d is formed perpendicular to the axis of the holder body 13.

An end portion of a pull stud 14 is fixedly engaged with the female-threaded hole 13e formed in the holder body 13. A center hole 14a is formed through the pull stud 14.

An end mill body 15 has a shank portion 15a and a front-side portion 15d. The shank portion 15a has an outer circumferential surface 15g which tapers down rearward gently at a taper of 1/200 and assumes a round-rod shape having a size slightly greater than that of the taper hole 13h. The front-side portion 15d extends frontward from a rear end face 15c of a front portion 15b of the end mill body 15. A rear portion of the front-side portion 15d has a greater diameter than does a front portion of the front-side portion 15d. A cut 15e is formed at a front end portion of the front-side portion 15d. A cutting means 16; i.e., a throwaway ball tip is removably attached to the front end portion. The rear end face 15c is formed perpendicular to the outer circumferential surface of the shank portion 15a.

Figure 6:
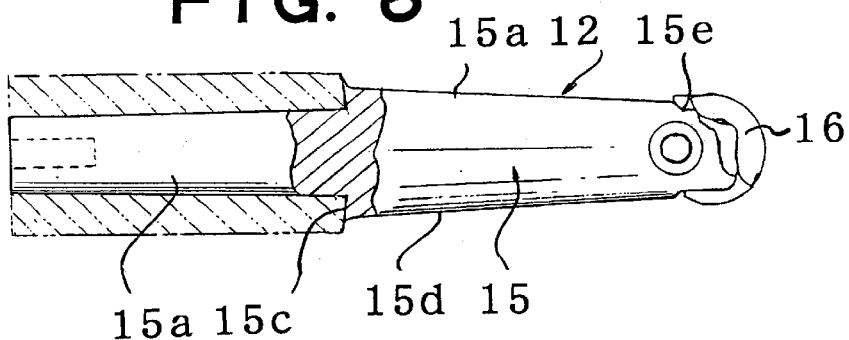
FIG. 6 is a partially cutaway side view of the main portion of the end mill chucking structure of FIG. 4 and representing engagement of the end mill body and the holder body.

As shown in FIG. 6, the end mill body 15 is formed such that the shank portion 15a tapers down rearward and such that the front-side portion 15d tapers down more gently than does the taper portion 13d of the holder body 13.

The temperature at which heat is applied for fitting is about 200° C. or lower, which is lower than a conventional shrink-fitting temperature. The taper hole 13h and the shank portion 15a have a taper of 1/50 to 1/200.

A conventional shrink-fitting temperature is 300° C. to 600° C., whereas the present embodiment employs a shrink-fitting temperature of 200° C. Since, in the case of steel materials, the temperature of tempering to be performed after quenching is not higher than 200° C., a temperature not higher than 200° C. does not cause a change in hardness and microstructure thereof.

For example, when a shank portion is to be shrink-fitted into a hole having an inside diameter of 10 mm through application of heat at a temperature of 200° C., the inside diameter expands about 0.02 mm. Further, when the taper is 1/200, the shank portion is axially drawn inward about 4 mm, thereby effecting an appropriate interference.

A male-threaded portion 17a of a draw bolt 17 is inserted from the rear side into the small-diameter hole 13g formed in the holder body 13 and is then screwed into a female-threaded hole 15f formed in a rear portion of the end mill body 15, thereby firmly engaging the holder body 13 and the end mill body 15 together.

In the embodiment shown in FIG. 4 and an embodiment shown in FIG. 10, the end mill 12 is removed from the holder body 13 in the following manner. The holder body 13 is heated, as needed, at a temperature lower than a conventional shrink-fitting temperature. The draw bolt 17 is loosened. The head of the draw bolt 17 is hit to thereby remove the shank portion 15a of the end mill body is from the holder body 13. In the case of an embodiment shown in FIG. 7, the holder body 13 is heated at a temperature lower than a conventional shrink-fitting temperature. A male-threaded portion 15h of the shank portion 15a of the end mill body 15 is unscrewed from a female-threaded portion 13j formed in the holder body 13. Then, the shank portion 15a is removed from the holder body 13.

Figure 7:
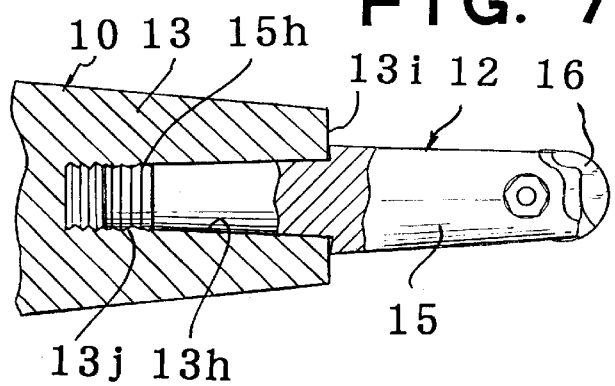
FIG. 7 is a longitudinal, partially sectional view showing an end mill engaged with an end mill holder.

As shown in FIG. 7, the female-threaded portion 13j is formed at a rear end portion of a hole 13h formed in a front portion of the holder body 13. The male-threaded portion 15h formed on a rear end portion of the end mill body 15 is screwed into the female-threaded portion 13j to thereby fixedly attach the end mill body 15 to the holder body 13 without use of the above-mentioned draw bolt.

Figure 8:
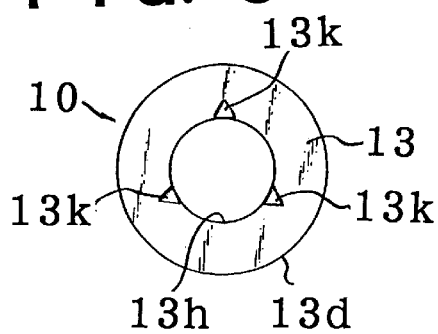
FIG. 8 is a view showing the front end of a modified embodiment of the end mill holder of FIG. 7.

As shown in FIG. 8, a plurality of grooves 13k, each having a triangle or arc cross section, are formed in the axial direction of the holder body 13 on the wall surface of the taper hole 13h formed in the holder body 13 and are arranged in the corresponding circumferential positions. The grooves 13k are adapted to discharge fluid, such as coolant or cutting liquid, from the front end of the holder body 13. Alternatively, as shown in FIG. 9, a plurality of small holes 13n may be formed it the axial direction of the holder body 13 in the taper portion 13d of the holder body 13 and may be arranged in the corresponding circumferential positions, so as to discharge fluid, such as coolant, from the front end of the holder body 13.

Figure 9:
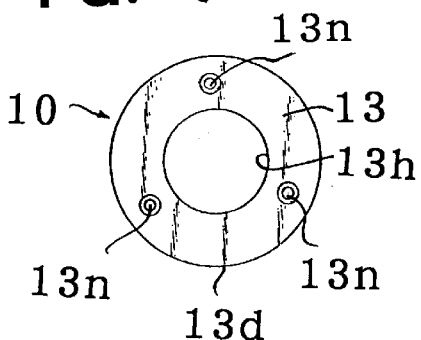
FIG. 9 is a view showing the front end of another modified embodiment of the end mill holder of FIG. 7.

Fluid, such as coolant, may be supplied to the grooves 13k shown in FIG. 8 or the small-holes 13n shown in FIG. 9, by conventionally known means.

Figure 10:
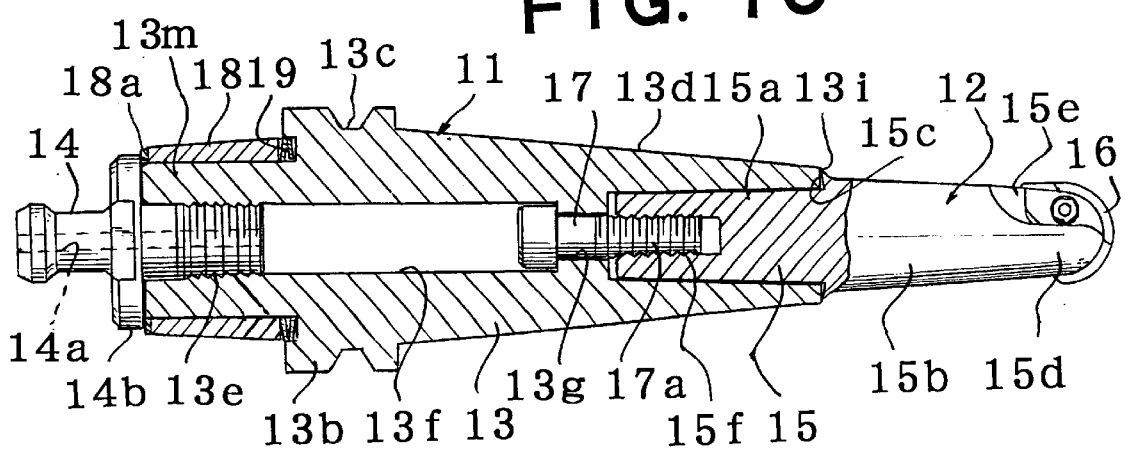
FIG. 10 is a partially cutaway side view of an end mill chucking structure according to a second embodiment of the present invention.

In the second embodiment shown in FIG. 10, a cylindrical shank portion 13m is formed at a tear end portion of the holder body 13; a taper cone 18 is fitted to the shank portion 13m so as to be located between a larger-diameter-flange portion 14b of the pull stud 14 and the flange portion 13b for use in automatic tool change; the front end of the taper cone 18 may be pressed against the flange portion 13b while a plurality of disc springs 19 are disposed therebetween; and an annular washer 18a may be disposed between the larger-diameter-flange portion 14b and the rear end of the taper cone 18. Other features of the end mill chucking structure of FIG. 10 are similar to those of the first embodiment shown in FIG. 4 and are denoted by common reference numerals. Description of those feature s is omitted.

Figure 11A:
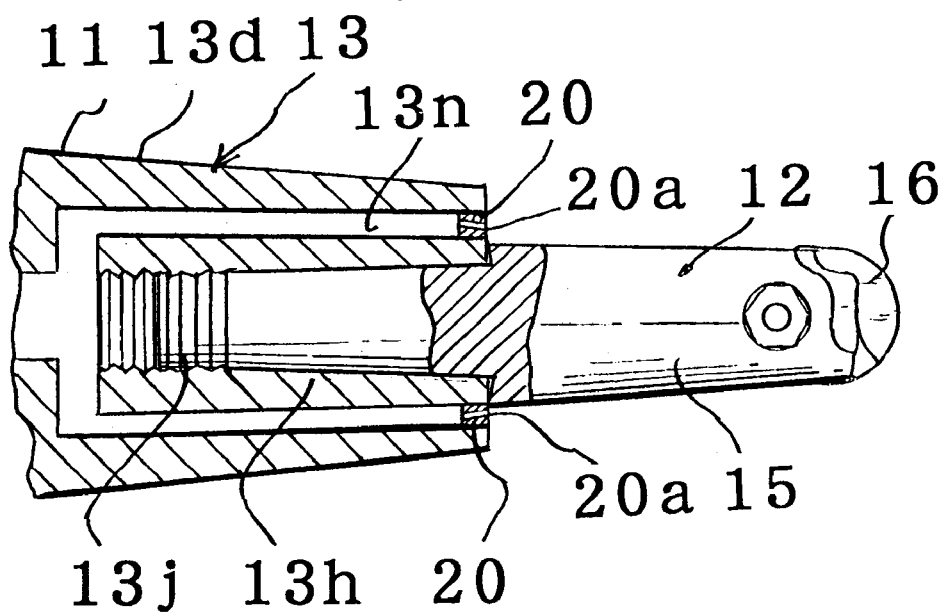
FIG. 11A is a longitudinal, partially sectional view showing a modified embodiment of the end mill chucking structure of FIG. 10 and representing a section taken along line A—A of FIG. 11B.
Figure 11B:
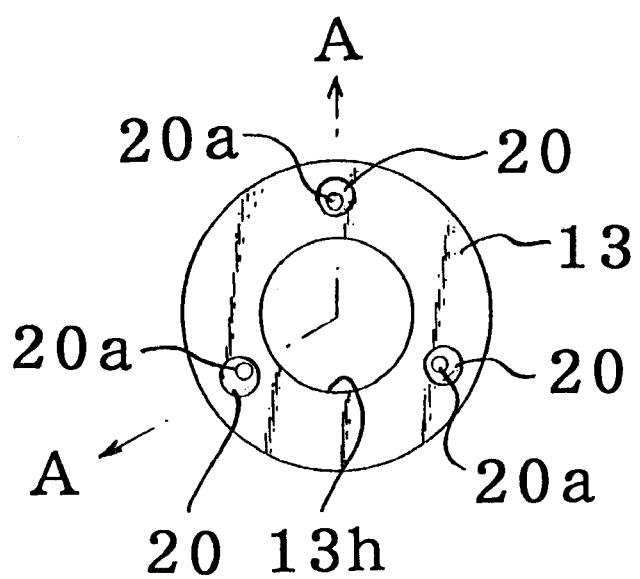
FIG. 11B is a view showing the front end of the end mill holder of FIG. 11A.

As shown in FIGS. 11A and 11B, a plurality of small holes 13n may be formed in the axial direction of the holder body 13 in the taper portion 13d of the holder body 13 and may be arranged in the corresponding circumferential positions. Further, a cylindrical bush 20 having an inclined discharge hole 20a formed therein may be fixedly attached to the front end of each small hole 13n by means of fitting or screw engagement. The cylindrical bush 20 serves as a discharge angle modification member for directing fluid, such as coolant, to be discharged. The bush 20 reliably directs discharged fluid, such as coolant, toward a cutting member located at the front end of the end mill 12. The bush 20 is particularly effective when the front end diameter of the holder body 13 is too small to impart an appropriate inclination to a discharge end portion of the small hole 13n.

A cutting means or member disposed at a front end portion of the end mill body 15 is not limited to a ball tip, but may be modified as appropriate. Also, a straight or helical tooth may be integrally formed at a front end portion of the end mill body 15.

In the case of the end mill chucking structure shown in FIG. 4, the taper portion 13d of the holder body 13 may be lengthened so as to reduce the length of the tapered shank portion 15a of the end mill body 15, thereby avoiding using an expensive long-size end mill of cemented carbide. Thus, the present invention provides an inexpensive end mill chucking structure and implements a highly rigid end mill holder, thereby enabling highly accurate cutting.

When a deep hole is to be cut in a die by means of a ball end mill, the combined overall taper of the ball end mill and holder becomes smaller than the draft of the die. This feature is favorable to cutting.

Figure 12:
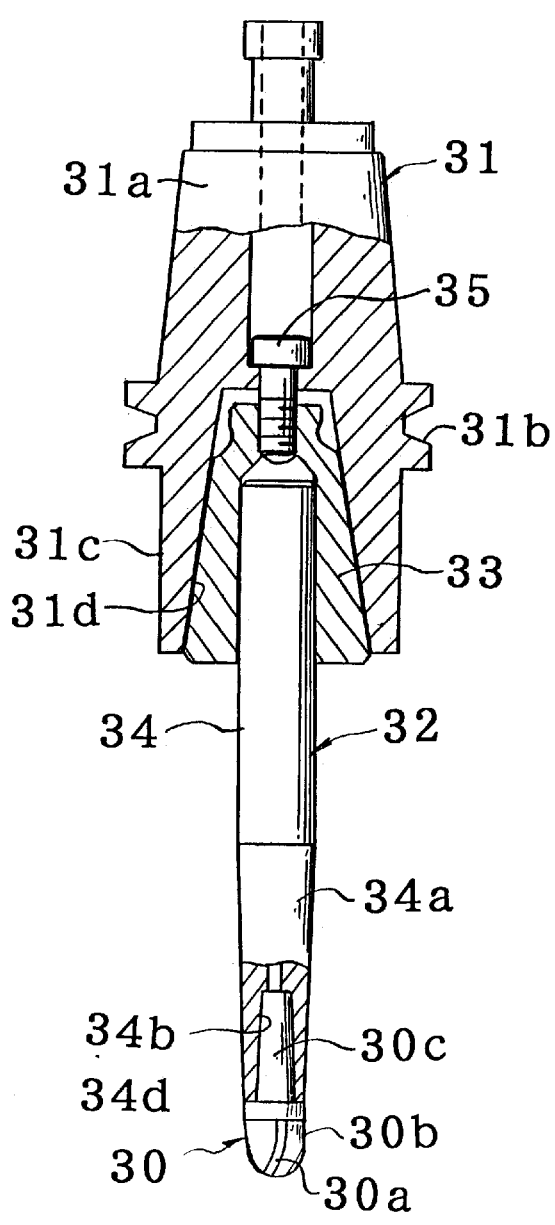
FIG. 12 is a partially cutaway side view of an end mill chucking structure according to a third embodiment of the present invention.
Figure 13:
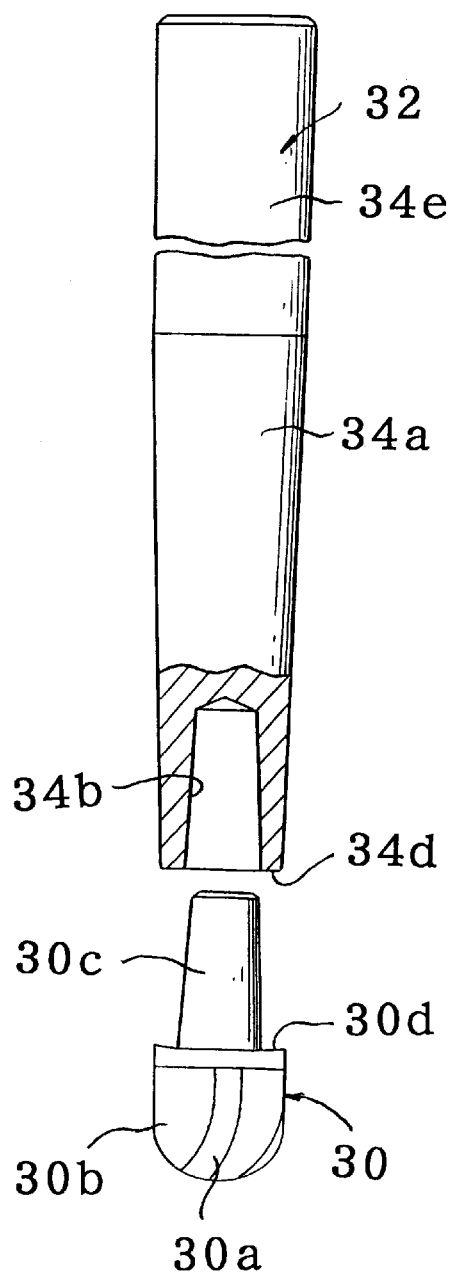
FIG. 13 is a partially cutaway side view showing removal of an end mill from an adapter of the end mill chucking structure of FIG. 12 effected through application of heat.

FIG. 12 shows an end mill chucking structure according to a third embodiment of the present invention. FIG. 13 shows removal of an end mill from an adapter of the end mill chucking structure of FIG. 12 effected through application of heat.

The present embodiment employs an adapter 32 for attaching to a tool holder 31 an end mill 30 having a relatively small diameter (up to about 12 mm).

The adapter 32 is made of cemented carbide and has a straight shank portion 34 having a desired length and an arbor portion 34a. The straight shank portion 34 is attached to the tool holder 31 by means of a taper collet 33. The arbor portion 34a extends frontward coaxially from the straight shank portion 34 over a predetermined length and tapers down frontward at a taper angle of 3° to 5°. A taper hole 34b of a predetermined depth is formed coaxially in the arbor portion 34a and extends from the front end of the arbor portion 34a toward the straight shank portion 34. The end mill 30 is shrink-fitted into the taper hole 34b. The taper hole 34b has a taper of $1/50$ to $1/200$.

The end mill 30 has a mill body portion 30b of cemented carbide and a taper shank portion 306. A cutting edge 30a is formed at a front end portion of the mill body portion 30b. The taper shank portion 30c extends rearward coaxially from the mill body portion 30b and is shrink-fitted into or removed, through application of heat, from the taper hole 34b formed in the arbor portion 34a. The face of a rear end of the mill body portion 30b extends outward from the circumferential surface of the taper shank portion 30c and serves as a contact face 30d. The contact face 30d abuts the front end face 34d of the arbor portion 34a upon shrink-fitting of the taper shank portion 30c into the taper hole 34b. The contact surface 30d is perpendicular to the outer circumferential surface of the taper shank portion 30c.

The taper shank portion 30c has a similar taper of $1/50$ to $1/200$ as does the taper hole 34b.

In the present embodiment, when the end mill 30 is to be shrink-fitted to the adapter 32, the arbor portion 34a of the adapter 32 is heated to a temperature of about 200° C. In the case where the arbor portion 34a has a diameter of 10 mm as measured at the front end thereof, the inside diameter of the taper hole 34b expands about 0.02 mm. As a result, in the case of a taper of $1/200$, the taper shank portion 30c is axially drawn inward about 4 mm, thereby effecting an appropriate interference.

Since, in the case of steel materials, the temperature of tempering to be performed after quenching is not higher than 200° C., a temperature not higher than 200° C. does not cause a change in hardness and microstructure of adapter material.

The arbor portion 34a is heated to the above temperature so as to thermally expand the taper hole 34b formed therein. The taper shank portion 30c of the end mill 30 is inserted into the thermally expanded taper hole 34b until the contact face 30d of the mill body portion 30b abuts a front end face 34d of the arbor portion 34a. When the temperature of the arbor portion 34a drops to room temperature, the end mill 30 is firmly chucked by the adapter 32 through shrink-fitting.

When the end mill 30 chucked by the arbor portion 34a of the adapter 32 is to be removed therefrom, the arbor portion 34a is heated to a temperature of about 200° C.

As shown in FIG. 12, the tool holder 31 has a shank portion 31a, a flange 31b, and a cylindrical tool attachment portion 31c. The shank portion 31a is attached to a spindle of a machine tool. The flange 31b is located at the larger-diameter end of the shank portion 31a. The tool attachment portion 31c extends frontward coaxially from the front end face of the flange 31b, A taper hole 31d is formed in the tool attachment portion 31c and is adapted to receive the taper collet 33.

As shown in FIG. 12, when the adapter 32 to which the end mill 30 is attached is to be attached to the tool holder 31, the straight shank portion 34 of the adapter 32 is inserted into the taper collet 33 which is fitted into the taper hole 31d formed in the tool attachment portion 31c. A draw bolt 35 which is inserted into the tool holder 31 from the rear end thereof is screwed into an engagement end of the taper collet 33. The taper collet 33 is drawn rearward by means of the draw bolt 35, thereby firmly holding the adapter 32 including the end mill 30 by means of the taper collet 33.

According to the third embodiment, the taper hole 34b of a predetermined depth and adapted to receive the end mill 30 through shrink-fitting is formed coaxially in the arbor portion 34a of the adapter 32 and extends from the front end of the arbor portion 34a toward the straight shank portion 34. The taper shank portion 30c extends rearward from the mill body portion 30b and is shrink-fitted into or removed, through application of heat, from the taper hole 34b formed in the arbor portion 34a. Since the taper shank portion 30c is adapted to be shrink-fitted into or removed, through application of heat, from the taper hole 34b formed in the arbor portion 34a, the end mill 30 can be easily shrink-fitted into or removed from the adapter 32 through application to the adapter 32 heat at a relatively low temperature of about 200° C., which does not cause a change in physical properties of adapter material. Also, chucking of a small-diameter end mill can be achieved easily.

Also the face of a rear end of the mill body portion 30b extends outward from the circumferential surface of the taper shank portion 30c and serves as the contact face 30d. The contact face 30d abuts the front end face 34d of the arbor portion 34a upon shrink-fitting of the taper shank portion 30c into the taper hole 34b. Thus, the end mill 30 is restrained by means of two surfaces; specifically, the outer circumferential surface of the taper shank portion 30c and the contact face 30d, thereby improving the rigidity of the end mill 30 and preventing vibration of the end mill 30 during cutting to thereby yield good cutting performance.

A modified embodiment of the end mill chucking structure of FIG. 12 will next be described with reference to FIG. 14.

In FIG. 14, a front end portion 34g of the arbor portion 34a of the adapter 32 including at least the taper hole 34b is made of steel having a coefficient of thermal expansion greater than that of cemented carbide, and a remaining portion 34f of the adapter 32 including a straight shank portion 34e is made of cemented carbide. The front end portion 34g and the remaining portion 34f are firmly connected together by a connection means 36. The taper shank portion 30c of the end mill 30 is shrink-fitted into the taper hole 34b formed in the front end portion 34g.

As shown in FIG. 14, the connection means 36 assumes, for example, the following structure. A male-threaded portion 36a projects frontward coaxially from the front end of the remaining portion 34f. A female-threaded hole 36b is formed coaxially In the front end portion 34g in such a manner as to extend frontward from the rear end of the front end,portion 34g. The male-threaded portion 36a is screwed into the female-threaded hole 36b to thereby connect the front end portion 34g and the remaining portion 34f together.

The connection means 36 is not limited to the structure shown in FIG. 14. For example, the connection means 36 may assume an interference fit structure. The present modified embodiment is described while mentioning shrink-fitting of the taper shank portion 30c of the end mill 30 into the taper hole 34b formed in the front end portion 34g of the adapter 32. However, in the case of an end mill having a relatively small diameter, press-fitting may be employed by use of a tool of gun metal.

According to the present modified embodiment, the front end portion 34g of the arbor portion 34a—into which the end mill 30 is press-fitted or shrink-fitted—is made of steel having a relatively high coefficient of thermal expansion, thereby further reducing the temperature at which heat is applied for shrink-fitting or removal of the end mill 30. The remaining portion 34f including the straight shank portion 34e is made of cemented carbide, thereby permitting employment of a relatively long shank portion and thus facilitating deep-hole boring by use of the small-diameter end mill 30.

Another modified embodiment of the end mill chucking structure of FIG. 12 will next be described with reference to FIG. 15.

As shown in FIG. 15, passages 37 and 38 are formed coaxially in the adapter 32 and the end mill 30, respectively, in order to supply fluid, such as coolant, therethrough. Fluid, such as coolant, flows through the passages 37 and 38 and is then discharged from the front end of the mill body portion 30b toward a cutting point.

According to the present modified embodiment, a workpiece can be cooled, or adhesion of chips to the workpiece can be prevented, during cutting, thereby yielding good cutting performance free of cutting scorch or scratches.

Still another modified embodiment of the end mill chucking structure of FIG. 12 will next be described with reference to FIG. 16.

As shown in FIG. 16, the shank portion 34 of the adapter 32 is tapered. A rear end portion of the taper shank portion 34 which is inserted into the tool holder 31 has a female-threaded hole 35a formed therein. The draw bolt 35 is inserted into the tool holder 31 from the rear end thereof and is screwed into the female-threaded hole 35a. Other structural features are similar to those of FIG. 12.

According to the present modified embodiment, the shank portion 34 of the adapter 32 is tapered, so that the taper collet 33 shown in FIG. 12 becomes unnecessary. Also, run-out of the end mill 30 can be reduced.

Further modified embodiments of the end mill chucking structure of FIG. 12 will next be described with reference to FIGS. 17A, 17B, 17C, 18A, 18B, and 18C.

Figure 17A:
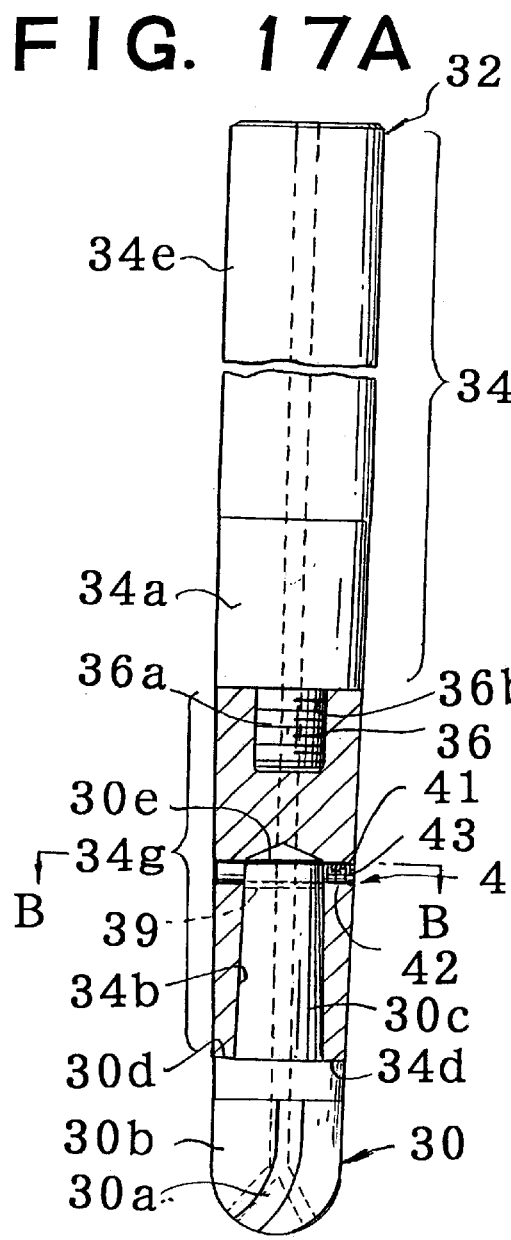
FIG. 17A is a partially cutaway side view showing a further modified embodiment of the end mill chucking structure of FIG. 12.

As shown in FIG. 17A, the front end portion 34g of the arbor portion 34a of the adapter 32 including at least the taper hole 34b is made of steel having a coefficient of thermal expansion greater than that of cemented carbide, and the remaining portion 34f of the adapter 32 including the straight shank portion 34e is made of cemented carbide. The front end portion 34g and the remaining portion 34f are firmly connected together by the connection means 36. The taper shank portion 30c of the end mill 30 is shrink-fitted into the taper hole 34b formed in the front end portion 34g.

A through-hole 41 is formed in the front end portion 34g perpendicular to the axis of the front end portion 34g and is located in a substantially central position with respect to the axial direction of the front end portion 34g; i.e., the through-hole 41 is substantially aligned with the rear end of the taper hole 34b. Female threads 42 are formed at one end portion of the through-hole 41. A groove 39 is formed perpendicular to the axis of the end mill 30 on a rear end face 30e of the taper shank portion 30c of the end mill 30. A locking pin 40 is inserted into the through-hole 41 so as to engage the groove 39 of the taper shank portion 30c press-fitted or shrink-fitted into the taper hole 34b. A male-threaded one end portion, i.e., a male-threaded portion 43 of the locking pin 40, is engaged with the female threads 42. Thus, a locking mechanism for the end mill 30 is formed so as to prevent rotation of the end mill 30. In place of the groove 39, a through-hole for reception of the locking pin 40 may be formed perpendicular to the axis of the end mill 30 in a rear end portion of the taper shank portion 30c. Because of cemented carbide, formation of such a through-hole is difficult, though.

As in the case of the embodiment shown in FIG. 14, the connection means 36 assumes the following structure. The male-threaded portion 36a projects frontward coaxially from the front end of the remaining portion, 34f. The female-threaded hole 36b is formed coaxially in the front end portion 34g in such a manner as to extend frontward from the rear end of the front end portion 34g. The male-threaded portion 36a is screwed into the female-threaded hole 36b to thereby connect the front end portion 34g and the remaining portion 34f together.

According to the present modified embodiment, the front end portion 34g of the arbor portion 34a—into which the end mill 30 is press-fitted or shrink-fitted—is made of steel having a relatively high coefficient of thermal expansion, and the locking mechanism prevents rotation of the end mill 30 press-fitted or shrink-fitted into the arbor portion 34a. When the end mill 30 having a small-diameter is used, a gripping force of a front end portion of the adapter 32 decreases. Specifically, as the front-end diameter of the adapter 32 decreases, the wall thickness of the front end portion of the adapter 32 decreases. As a result, during cutting, the shank portion 30c of the end mill 30 slips within the taper hole 34b formed in the front end portion of the adapter 32 due to expansion of the taper hole 34b. The locking mechanism prevents such slippage of the end mill 30, thereby providing a highly accurate end mill chucking structure which does not involve an increase in run-out of the end mill 30.

Other features of the modified embodiment are similar, to those of the third embodiment shown in FIG. 12 and are denoted by common reference numerals. Description of those features is omitted.

Figure 17B:
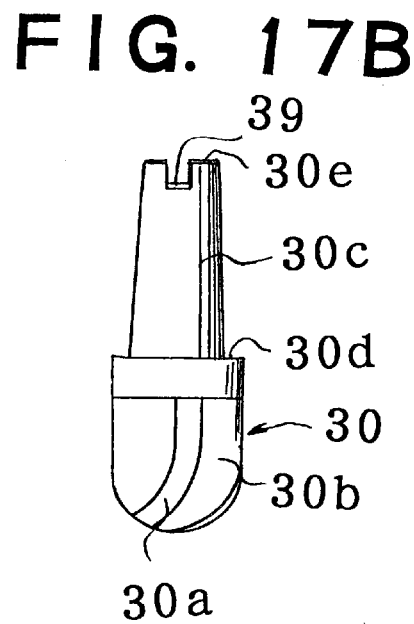
FIG. 17B is a front view showing the end mill of FIG. 17A.
Figure 17C:
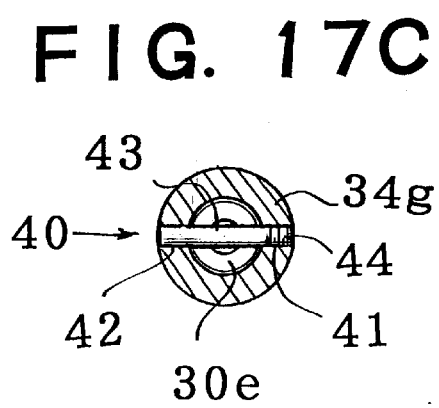
FIG. 17C is a sectional view taken along line B—B of FIG. 17A.
Figure 18A:
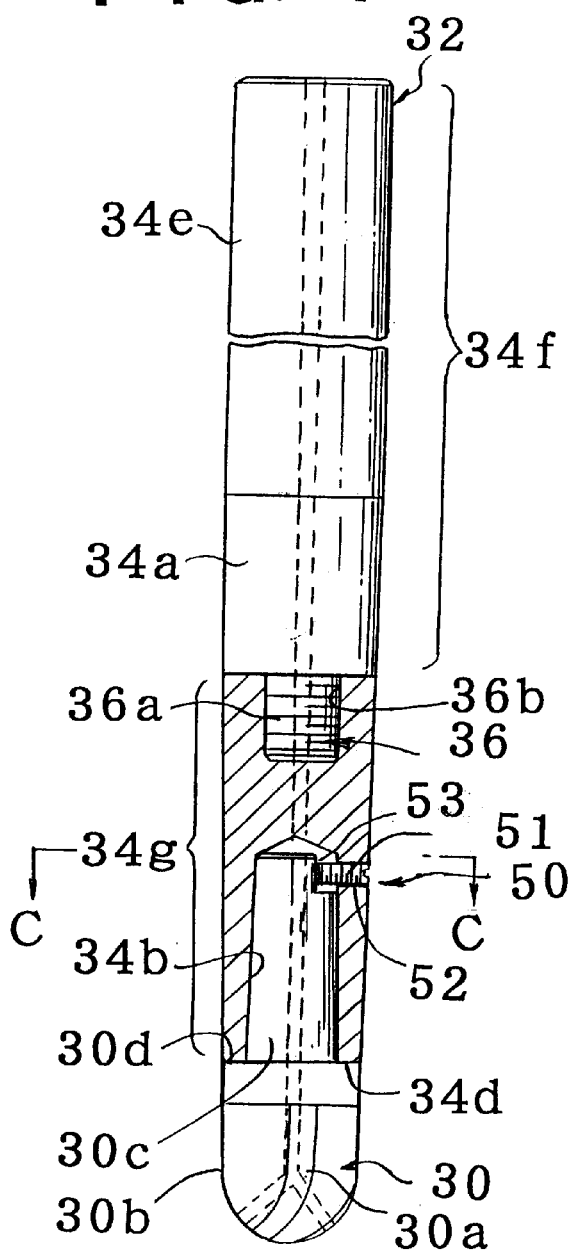
FIG. 18A a partially cutaway side view showing a further modified embodiment of the end mill chucking structure of FIG. 12.
Figure 18B:
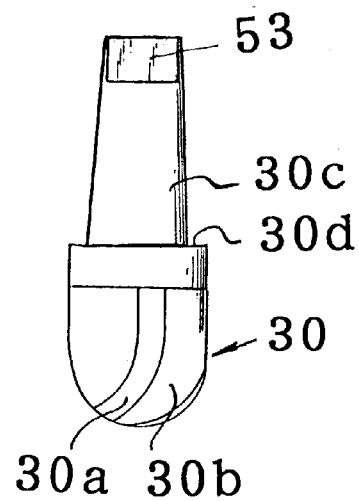
FIG. 18B is a front view showing the end mill of FIG. 18A.
Figure 18C:
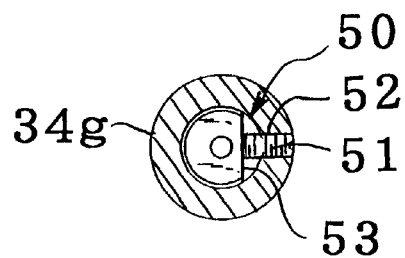
FIG. 18C is a sectional view taken along line C—C of FIG. 18A.

FIGS. 18A to 18C show a modified embodiment of the locking mechanism shown in FIGS. 17A to 17C.

The present modified embodiment employs a locking screw 51 in place of the locking pin 40 employed in the modified embodiment of FIGS. 17A to 17C. A female-threaded through-hole 52 is formed in the front end portion 34g perpendicular to the axis of the front end portion 34g in such a manner as to extend from the outer surface of the front end portion 34g to the taper hole 34b and is located in a substantially central position with respect to the axial direction of the front end portion 34g; i.e., the through-hole 52 is substantially aligned with the rear end of the taper hole 34b. A flat portion 53 is formed axially at an end portion of the shank portion 30c of the end mill 30. The locking screw 51 is screwed into the female-threaded through-hole 52 so as to project into the taper hole 34b and press against the flat portion 53 of the shank portion 30c press-fitted or shrink-fitted into the taper hole 34b, thereby implementing a locking mechanism 50.

In place of the flat portion 53, a flat-bottomed engagement groove having a cross section shaped in a squarish letter U and adapted to receive the locking screw 51 may be formed at a rear end portion of the shank portion 30c.

The modified embodiments shown in FIGS. 17A and 18A are described while mentioning application of the locking mechanism 50 to the end mill chucking mechanism shown in FIG. 14. However, the present invention is not limited thereto. The locking mechanism 50 may be applied to the end mill chucking structure shown in FIG. 12.

What is claimed is:

1. An end mill chucking structure comprising:
   an end mill holder comprising a holder body having a taper hole formed in a front portion thereof, the taper hole tapering down rearward and extending rearward from a front end of the holder body; and
   an end mill comprising an end mill body and cutting means provided at a front end of the end mill body, a rear portion of the end mill body tapering down rearward and serving as a shank portion, a rear end face of a front portion of the end mill body extending radially outward from an outer circumferential surface of the shank portion,
   wherein the shank portion of the end mill body is press-fitted or shrink-fitted into the taper hole formed in the holder body through application of heat at a temperature lower than an ordinary shrink-fitting temperature such that the rear end face of the front portion of the end mill body abuts a front end face of the holder body, to thereby fixedly attach the end mill body to the holder body.

2. An end mill chucking structure according to claim 1, wherein the rear end face of the front portion of the end mill body extends perpendicularly from the outer circumferential surface of the shank portion.

3. An end mill chucking structure according to claim 1, wherein the front portion of the end mill body is formed into a relatively long taper portion which tapers down frontward; a rear end of the taper portion has a diameter smaller than that of the front end face of the holder body; and cutting means is removably attached to the front end portion of the end mill body.

4. An end mill chucking structure according to claim 1, wherein the rear end face of the front portion of the end mill body is caused to abut the front end face of the holder body by means of a draw bolt accommodated within the front portion of the holder body, to thereby fixedly attach the end mill body to the holder body.

5. An end mill chucking structure according to claim 1, wherein female threads are formed on a wall surface of the taper hole formed in the holder body to thereby form a female-threaded portion; male threads are formed on an outer circumferential surface of a rear portion of the shank portion of the end mill body to thereby form a male-threaded portion; and the male-threaded portion is screwed into the female-threaded portion to thereby fixedly attach the end mill body to the holder body.

6. An end mill chucking structure according to claim 1, wherein a groove is formed on a wall surface of the taper hole formed in the holder body so as to discharge fluid therethrough and frontward from the holder body.

7. An end mill chucking structure according to claim 1, wherein a small hole is formed in the holder body so as to discharge fluid therethrough and frontward from the holder body.

8. An end mill chucking structure according to claim 7, wherein a discharge angle modification member for directing fluid to be discharged from the holder body is disposed at a front end portion of the small hole.

9. The end mill chucking structure according to claim 1, wherein the end mill is restrained by the end mill holder on both the rear end face of the front portion and the outer circumferential surface of the shank portion, thereby improving the rigidity of the end mill, preventing vibration of the end mill, and yielding good cutting performance.

10. An end mill chucking structure comprising:

a tool holder;

an adapter having a shank portion and an arbor portion, the shank portion being fixedly attached to said tool holder and having a predetermined length, the arbor portion having a predetermined length extending coaxially from a front end of the shank portion and tapering down frontward, a taper hole having a predetermined depth being formed coaxially in the arbor portion and extending from a front end of the arbor portion toward the shank portion; and an end mill having a mill body portion and a taper shank portion, the mill body portion having a cutting edge at a front end portion thereof, the taper shank portion extending do axially from a rear end of the mill body portion and being removably fitted into the taper hole formed in the arbor portion of said adapter, a rear end face of the mill body portion projecting outward from the taper shank portion in a flange-like manner so as to serve as a contact face and abutting a front end face of the arbor portion of said adapter upon fitting of the taper shank portion into the taper hole.

11. An end mill chucking structure according to claim 10, wherein the contact face is perpendicular to the outer circumferential surface of the taper shank portion.

12. An end mill chucking structure according to claim 10, wherein the shank portion of said adapter is straight or tapered.

13. An end mill chucking structure according to claim 10, wherein a front end portion of the; arbor portion of said adapter including at least the taper hole is made of steel having a coefficient of thermal expansion greater than that of cemented carbide, and a remaining portion of said adapter including the shank portion is made of cemented carbide.

14. An end mill chucking structure according to claim 13, wherein the front end portion of the arbor portion of said adapter is connected to the remaining portion of said adapter by use of connection means.

15. An end mill chucking structure according to claim 13, wherein a passage is formed in said adapter and end mill so as to supply fluid therethrough to a cutting point.

16. An end mill chucking structure according to claim 10, wherein a locking mechanism for preventing rotation of said end mill is provided at a portion at which the end mill is coaxially attached to the front end portion of the arbor portion.

17. An end mill chucking structure according to claim 16, wherein the locking mechanism comprises a locking screw screwed removably into a female-threaded hole formed perpendicular to an axis of said adapter in the front end portion of the arbor portion of said adapter and extending from an outer surface of the arbor portion to the taper hole formed in the arbor portion, and a flat portion formed axially at an end portion of the taper shank portion of said end mill, and wherein the locking screw and the flat portion engage with each other to thereby prevent rotation of said end mill press-fitted or shrink-fitted Into the arbor portion of said adapter.

18. An end mill chucking structure according to claim 16, wherein the locking mechanism comprises a locking pin inserted removably into a through-hole formed perpendicular to an axis of said adapter in the front end portion of the arbor portion of said adapter, and a groove formed on a rear end face of the taper shank portion of said end mill, and wherein the locking pin and the groove engage with each other to thereby prevent rotation of said end mill press-fitted or shrink-fitted into the arbor portion of said adapter.

* * * * *